United States Patent [19]
Fehnel

[11] Patent Number: 5,887,251
[45] Date of Patent: Mar. 23, 1999

[54] AUTHENTICATION KEY MANAGEMENT FOR MOBILE STATIONS

[75] Inventor: Michael David Fehnel, Fuquay-Varina, N.C.

[73] Assignee: Ericsson Inc., Research Triangle Park, N.C.

[21] Appl. No.: 739,259

[22] Filed: Oct. 30, 1996

[51] Int. Cl.$^6$ .................................................... H04Q 7/32
[52] U.S. Cl. ........................ 455/411; 340/825.34; 380/23
[58] Field of Search ...................... 455/411; 340/825.34; 380/21, 23, 46

[56] References Cited

U.S. PATENT DOCUMENTS

| | | | |
|---|---|---|---|
| 5,091,942 | 2/1992 | Dent ........................................... | 380/46 |
| 5,513,245 | 4/1996 | Mizikovsky et al. ................... | 455/411 |
| 5,551,073 | 8/1996 | Sammarco ............................... | 455/411 |

FOREIGN PATENT DOCUMENTS

WO 96/01536   1/1996   WIPO.

*Primary Examiner*—Andrew M. Dollnar
*Attorney, Agent, or Firm*—Robert A. Samra

[57] ABSTRACT

The present invention allows a mobile station to receive a command entered by a user for selecting among a plurality of possible values for an authentication key (A-key) stored in its memory, including a default value, a random value and a custom (user-defined) value for the A-key. In response to the command, the mobile station can set the A-key in its memory to the default value or to an internally generated or previously stored random value, or to the custom value entered by the user. The command, whether for selecting the default, random or custom A-key value, may be entered during number assignment module (NAM) programming of the mobile station.

20 Claims, 3 Drawing Sheets

AUTHENTICATION KEY MANAGEMENT FOR MOBILE STATIONS

BACKGROUND OF THE INVENTION

1. Field of the Invention

The present invention relates to wireless communication systems, and more particularly, to a method and apparatus for the management of authentication keys (A-keys) which are used to authenticate mobile stations in a cellular radio system.

2. Related Prior Art Systems

The prior art includes cellular radio systems which have been operating in the United States since the early 1980s, and providing telephone service to an ever growing subscriber base, presently estimated at over 20 million subscribers. Cellular telephone service operates much like the fixed, wireline telephone service in homes and offices, except that radio frequencies rather than telephone wires are used to connect telephone calls to and from the mobile subscribers. Each mobile subscriber is assigned a private (10 digit) directory telephone number and is usually billed based on the amount of "airtime" he or she spends talking on the cellular telephone each month. Many of the service features available to landline telephone users (e.g., call waiting, call forwarding, three-way calling, etc.) are also generally available to mobile subscribers.

In the United States, cellular licenses have been awarded by the Federal Communications Commission (FCC) pursuant to a licensing scheme which divided the country into geographic service markets defined according to the 1980 Census. Only two cellular licenses are awarded for each market. The two cellular systems in each market are commonly referred to as the "A" system and "B" system, respectively. Each of the two systems is allocated a different frequency block in the 800 MHz band (called the A-band and B-band, respectively). To date, the FCC has released a total of 50 Mhz for cellular services (25 MHz per system). Mobile subscribers have the freedom to subscribe to service from either the A-system or the B-system operator (or both). Each system will assign each of its own subscribers a mobile identification number (MIN). The local system from which service is subscribed is called the "home" system. When travelling outside the home system, a mobile subscriber may be able to obtain service in a distant system if there is a "roaming" agreement between the operators of the home and "visited" systems.

The architecture for a typical cellular radio system is shown in FIG. 1. A geographical area (e.g., a metropolitan area) is divided into several smaller, contiguous radio coverage areas, called "cells," such as cells C1–C10. The cells C1–C10 are served by a corresponding group of fixed radio stations, called "base stations," B1–B10, each of which includes a plurality of RF channel units (transceivers) that operate on a subset of the RF channels assigned to the system, as well known in the art. For illustration purposes, the base stations B1–B10 are shown in FIG. 1 to be located at the center of the cells C1–C10, respectively, and are shown to be equipped with omni-directional antennas transmitting equally in all directions. However, the base stations B1–B10 may also be located near the periphery or otherwise away from the centers of the cells C1–C10, and may illuminate the cells C1–C10 with radio signals directionally (e.g., a base station may be equipped with three directional antennas each covering a 120 degrees sector).

The RF channels allocated to any given cell (or sector) may be reallocated to a distant cell in accordance with a frequency reuse plan as is well known in the art. In each cell (or sector), at least one RF channel is used to carry control or supervisory messages, and is called the "control" or "paging/access" channel. The other RF channels are used to carry voice conversations, and are called the "voice" or "speech" channels. The cellular telephone users (mobile subscribers) in the cells C1–C10 are provided with portable (hand-held), transportable (hand-carried) or mobile (car-mounted) telephone units, collectively referred to as "mobile stations," such as mobile stations M1–M5, each of which communicates with a nearby base station. Each of the mobile stations M1–M5 includes a controller (microprocessor) and a transceiver, as well known in the art. The transceiver in each mobile station may tune to any of the RF channels specified in the system (whereas each of the transceivers in the base stations B1–B10 usually operates on only one of the different RF channels used in the corresponding cell).

With continuing reference to FIG. 1, the base stations B1–B10 are connected to and controlled by a mobile telephone switching office (MTSO) 20. The MTSO 20, in turn, is connected to a central office (not specifically shown in FIG. 1) in the landline (wireline) public switched telephone network (PSTN) 30, or to a similar facility such as an integrated system digital network (ISDN). The MTSO 20 switches calls between wireline and mobile subscribers, controls signalling to the mobile stations M1–M5, compiles billing statistics, stores subscriber service profiles, and provides for the operation, maintenance and testing of the system.

When turned on (powered up), each of the mobile stations M1–M5 enters the idle state (standby mode) and tunes to and continuously monitors the strongest control channel (generally, the control channel of the cell in which the mobile station is located at that moment). When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system to find the "best" control channel (in the United States, there are 21 "dedicated" control channels in each cellular system which means that the mobile station has to scan a maximum number of 21 RF channels). When a control channel with good reception quality is found, the mobile station remains tuned to this channel until the quality deteriorates again. In this manner, the mobile station remains "in touch" with the system and may receive or initiate a telephone call through one of the base stations B1–B10 which is connected to the MTSO 20.

To detect incoming calls, the mobile station continuously monitors the current control channel to determine whether a page message addressed to it (i.e., containing its MIN) has been received. A page message will be sent to the mobile station, for example, when an ordinary (landline) subscriber calls the mobile subscriber. The call is directed from the PSTN 30 to the MTSO 20 where the dialed number is analyzed. If the dialed number is validated, the MTSO 20 requests some or all of the base stations B1–B10 to page the called mobile station throughout their corresponding cells C1–C10. Each of the base stations B1–B10 which receive the request from the MTSO 20 will then transmit over the control channel of the corresponding cell a page message containing the MIN of the called mobile station. Each of the idle mobile stations M1–M5 which is present in that cell will compare the MIN in the page message received over the control channel with the MIN stored in the mobile station. The called mobile station with the matching MIN will automatically transmit a page response over the control channel to the base station, which then forwards the page response to the MTSO 20. Upon receiving the page response, the MTSO 20 selects an available voice channel in the cell from which the page response was received (the MTSO 20 maintains an idle channel list for this purpose), and requests the base station in that cell to order the mobile station via the control channel to tune to the selected voice channel. A through-connection is established once the mobile station has tuned to the selected voice channel.

When, on the other hand, a mobile subscriber initiates a call (e.g., by dialing the telephone number of an ordinary subscriber and pressing the "send" button on the telephone handset in the mobile station), the dialed number and MIN/ESN pair for the mobile station are sent over the control channel to the base station and forwarded to the MTSO 20, which validates the mobile station, assigns a voice channel and establishes a through-connection for the conversation as described before. If the mobile station moves between cells while in the conversation state, the MTSO 20 will perform a "handoff" of the call from the old base station to the new base station. The MTSO 20 selects an available voice channel in the new cell and then orders the old base station to send to the mobile station on the current voice channel in the old cell a handoff message which informs the mobile station to tune to the selected voice channel in the new cell. The handoff message is sent in a "blank and burst" mode which causes a short but hardly noticeable break in the conversation. Upon receipt of the handoff message, the mobile station tunes to the new voice channel and a through-connection is established by the MTSO 20 via the new cell. The old voice channel in the old cell is marked idle in the MTSO 20 and may be used for another conversation. Furthermore, when travelling outside the system, the mobile station may be handed off to a cell in an adjacent system if there is a roamning agreement between the operators of the two systems.

In order to properly direct incoming calls to a mobile station which is moving around between different cells or systems, it is necessary to keep track of the location and activity of the mobile station. For this purpose, an autonomous registration process has been used in which the mobile station sends a registration message to the system upon entering a new system area or a new location area (i.e., a predefined group of cells in the system), or at predetermined intervals defined by the system operator. The system area and location area registration functions can be used to identify the current location of the mobile station so that it can be paged in its actual (or most likely) location rather than in all locations in the system. Each time the system receives a registration message from a mobile station in its area, it marks this mobile station as being active and present in its system area, or in the particular location area containing the cell of the base station which received the registration message, and then sends a registration confirmation message to this mobile station. The periodic registration function, on the other hand, is used to determine whether a mobile station is active (powered and within radio range) in a cellular system. Incoming calls to inactive mobile stations can be routed immediately to a recorded message (e.g., "The mobile customer you have called has turned off the mobile unit or travelled out of the service area.") without ever paging these mobile stations. This reduces the paging load and results in more efficient use of the limited control channel capacity.

The primary parameters that regulate the various mobile registration functions include the next registration (NXTREG) value which is stored in each mobile station and the system identification (SID), location area identification (LOCAID), registration identification (REGID) and registration increment (REGINCR) values which are broadcast by the system on the control channel of each cell. The SID is a digital number which uniquely identifies the serving cellular system. The LOCAID is a digital number which identifies a particular location area comprised of one or more cells in the system. The REGINCR defines the length of the periodic registration interval. The REGID is a 20-bit counter that is stepped by one unit in every REGID message transmitted to the mobile station. The NXTREG value indicates when periodic registration is due and is calculated internally in the mobile station by adding the current values of REGID and REGINCR. A mobile station will register with the serving system if either the SID or LOCAID received over the control channel is different from the corresponding value which it stored the last time it received a registration confirmation message (thus implying that the mobile station has travelled to a new system or location area, respectively), or if the REGID value received over the control channel is greater than or equal to the stored NXTREG (thus implying that a periodic registration is due). The mobile station updates the NXTREG value (with the sum of the current REGID and REGINCR values) upon the receipt of each registration confirmation message and, also, after every successful voice channel designation (i.e., call originations and receptions are treated like normal periodic registrations since by making or receiving a call a mobile station shows its activity and location).

Access to the cellular system of FIG. 1 by any of the mobile stations M1–M5, whether for call origination or reception or for registration purposes, is controlled on the basis of a mobile identification number (MIN) and an electronic serial number (ESN) which are stored in the mobile station. The MIN identifies the service subscription and is a binary representation of the 10-digit directory telephone number of the mobile subscriber. The MIN is assigned by the cellular service provider (home system operator) and is usually programmed into a mobile station either when purchased by the original user or when sold to another user (i.e., at the time of service installation). The MINs of legitimate (paying) subscribers are stored by the MTSO 20. The ESN uniquely identifies the mobile station and is a digital number which is supplied by the manufacturer and permanently stored in the mobile station (i.e., factory-set, not to be altered in the field). The ESNs of mobile stations which have been reported to be stolen can be appropriately marked by the MTSO 20 and denied service permanently.

Besides the MIN and ESN, each mobile station is also identified by a station class mark (SCM) which designates the transmit power class, mode and bandwidth for the mobile station. Mobile stations in different power classes (portable, transportable or vehicular) will transmit at one of several specified power levels within different output power ranges (0.6, 1.6 or 4.0 Watts). The transmit power level within a given range can be increased or decreased by a power change command from the base station. Furthermore, some mobile stations have the ability to operate in a "discontinuous" transmission (DTX) mode in which they can switch autonomously between two transmitter power level states ("DTX high" and "DTX low"). In addition, some mobile stations are set to operate within only the "basic" frequency range initially allocated to cellular systems while others are also set to operate in the "extended" frequency range which was later allocated. Like the MIN and ESN, the relevant SCM information is stored in each mobile station.

User authorization for cellular service is usually performed at every system access (i.e., registration request, call origination or page response) by a mobile station. When making an access, the mobile station forwards the MIN, ESN and SCM to the system. The MTSO 20 maintains a "white list" containing the MIN/ESN pairs of valid home subscribers and a "black list" containing the ESNs of stolen or otherwise unauthorized mobile stations. The MTSO 20 checks the received MIN/ESN pair to determine whether it belongs to a valid home subscriber and, if not, whether the MIN belongs to an authorized "roamer" from another system and whether the ESN has been blacklisted. If the MIN/ESN pair is not valid, or if the MIN is not recognized or if the ESN is blacklisted, the mobile station may be denied access. Otherwise, the user is considered legitimate and the access is accepted. Service is then provided and controlled according to the received SCM information.

The original cellular radio systems, as described generally above, used analog transmission methods, specifically frequency modulation (FM), and duplex (two-way) RF channels in accordance with the Advanced Mobile Phone Service (AMPS) standard. According to the AMPS standard, each control or voice channel between the base station and the mobile station uses a pair of separate frequencies consisting of a forward (downlink) frequency for transmission by the base station (reception by the mobile station) and a reverse (uplink) frequency for transmission by the mobile station (reception by the base station). The AMPS system, therefore, is a single-channel-per-carrier (SCPC) system allowing for only one voice circuit (telephone conversation) per RF channel. Different users are provided access to the same set of RF channels with each user being assigned a different RF channel (pair of frequencies) in a technique known as frequency division multiple access (FDMA). This original AMPS (analog) architecture forms the basis for an industry standard sponsored by the Electronics Industries Association (EIA) and the Telecommunication Industry Association (TIA), and known as EIA/TIA-553.

In the late 1980s, however, the cellular industry in the United States began migrating from analog to digital technology, motivated in large part by the need to address the steady growth in the subscriber population and the increasing demand on system capacity. It was recognized early on that the capacity improvements sought for the next generation cellular systems could be achieved by either "cell splitting" to provide more channels per subscribers in the specific areas where increased capacity is needed, or by the use of more advanced digital radio technology in those areas, or by a combination of both approaches. According to the first approach (cell splitting), by reducing the transmit power of the base station, the size of the corresponding cell (or cell radius) and, with it, the frequency reuse distance are reduced thereby resulting in more channels per geographic area (i.e., increased capacity). Additional benefits of a smaller cell include a longer "talk time" for the user since the mobile station will use substantially lower transmit power than in a larger cell and, consequently, its battery will not need to be recharged as often.

While cell splitting held the promise of improving both capacity and coverage for the growing mobile subscriber base, the actual capacity gains were limited by the use of the analog AMPS technology. It was commonly believed that the desired capacity gains, and indeed the effectiveness of the microcellular (cell splitting) concept in increasing capacity, can be maximized only by the use of digital technology. Thus, in an effort to go digital, the EIA/TIA developed a number of air interface standards which use digital voice encoding (analog-to-digital conversion and voice compression) and time division multiple access (TDMA) or code division multiple access (CDMA) techniques to multiply the number of voice circuits (conversations) per RF channel (i.e., to increase capacity). These standards include IS-54 (TDMA) and IS-95 (CDMA), both of which are "dual mode" standards in that they support the use of the original AMPS analog voice and control channels in addition to digital speech channels defined within the existing AMPS framework (so as to ease the transition from analog to digital and to allow the continued use of existing analog mobile stations). The dual-mode IS-54 standard, in particular, has become known as the digital AMPS (D-AMPS) standard. More recently, the EIA/TIA has developed a new specification for D-AMPS, which includes a digital control channel suitable for supporting public or private microcell operation, extended mobile station battery life, and enhanced end-user features. This new specification builds on the IS-54B standard (the current revision of IS-54), and it is known as IS-136. (All of the foregoing EIA/TIA standards are hereby incorporated herein by reference as may be necessary for a full understanding of these background developments. Copies of these standards may be obtained from the Electronics Industries Association, 2001 Pennsylvania Avenue, N.W., Washington, D.C. 20006).

In addition to providing for a new, digital radio transmission format, each of IS-54B and IS-136 specifies an authentication procedure for confirming the identity of mobile stations demanding service in a cellular system. This procedure, which also has been imported into newer analog standards such as IS-91 for narrowband AMPS (N-AMPS) and Revision A of EIA/TIA-553 (EIA/TIA-553A currently under development), was developed in response to the widespread, fraudulent use of MIN/ESN pairs to steal cellular service from existing analog systems. Many of the mobile stations which have been sold to date do not comply with the tamper-proof requirement for ESN and, consequently, can be easily programmed with a new ESN (there is no tamperproof requirement for MIN and, hence, all mobile stations are easily programmed with a new MIN). Thus, these mobile stations can be programmed to transmit any MIN/ESN pair so as to "trick" the system into granting access. Further background on this MIN/ESN "tumbling" and the resultant revenue and service losses can be found in the article entitled "Cellular Fraud" by Henry M. Kowalczyk, in *Cellular Business*, dated March 1991, at pp. 32–35.

Fraud in the form of MIN/ESN tumbling arose primarily in a "manual roaming" environment where the cellular systems were not interconnected on a real-time basis. Since each MTSO usually contained a list only of valid MIN/ESN pairs belonging to the home subscribers, it did not have immediate access to the counterpart lists in the other systems. Hence, by using a roamer MIN (i.e., a 10-digit directory telephone number containing an area code other than the local area code of the home system operator) and a non-blacklisted ESN, a fraudulent mobile station could receive service from the local cellular system until an indication of the invalidity of the MIN/ESN pair has been received (perhaps hours later) from the home system of the pretending roamer (or from a clearing house). In an "automatic roaming" environment, however, the cellular systems are networked together on a real-time basis in accordance with the provisions of the EIA/TIA standard IS-41 (or through a proprietary signalling protocol). Consequently, the serving cellular system can obtain verification of a MIN/ESN pair from the home system virtually immediately and can, therefore, deny service to a MIN/ESN tumbler without significant delay.

Of more concern recently has been a type of fraud known as "cloning" in which a fraudulent user adopts the bona fide MIN/ESN pair of a valid (paying) subscriber. The fraudulent user may surreptitiously acquire a bona fide MIN/ESN pair, or even a list of valid MIN/ESN pairs, in several ways. For example, in some instances, bona fide MIN/ESN numbers are printed on, and may be read from, a label which is affixed to a mobile station belonging to a valid subscriber. In other instances, a list of bona fide MIN/ESN pairs may be purchased on the "black market" or directly from an employee of the cellular operator. In addition, since each mobile station transmits the MIN/ESN pair to the serving exchange at every system access, one or more bona fide MIN/ESN pairs may be intercepted by listening to radio transmissions on the (analog) control channel.

The authentication procedures in the newer industry standards seek to distinguish between legitimate mobile stations and fraudulent clones through the synchronized generation of cryptovariables from identical sets of shared secret data (SSD) which are stored and periodically updated in a mobile station and its serving base station. These cryptovariables are exchanged between the mobile station and the base station for the purpose of confirming the identity of the mobile station. Since a clone mobile station is assumed not to have access to the initial value of the SSD or the subsequent history of SSD updates in the legitimate mobile station, its cryptovariables will not match those of the base station and therefore it can be identified as a clone. The SSD for each mobile station is stored in the MTSO of the home system, or in a separate subscriber database called a "home location register" (HLR) which is connected to that MTSO, and provided to the serving base station. Each mobile station also stores its SSD in memory.

In the process of authentication, the base station generates and sends to the mobile station a random bit pattern, called RAND or RANDU, on the analog control channel (ACCH), digital control channel (DCCH), analog voice channel (AVCH) or digital traffic channel (DTCH). Each of the mobile station and the base station uses RAND or RANDU, a portion of SSD called SSD-A (the remaining portion, SSD-B, is used for encryption, and not for authentication), along with other parameters (e.g., the MIN and ESN of the mobile station) as inputs to a Cellular Authentication and Voice Encryption (CAVE) algorithm, which is defined in Appendix A to each of IS-54B and IS-136, to generate an authentication response called AUTHR or AUTHU (depending on whether RAND or RANDU is used, respectively). The authentication response computed in the mobile station is sent to the base station to be compared with the authentication response computed in the base station. If the authentication responses match, authentication is considered successful (i.e., the base station and the mobile station are considered to have identical sets of SSD). However, if the comparison at the base station fails, the base station may deny service to the mobile station or commence the process of updating the SSD.

The procedure for updating SSD for any mobile station involves the application of CAVE initialized with mobile station-specific information (ESN), certain random data (RANDSSD), and a secret, permanent authentication key (A-key) which is uniquely assigned to the mobile station. For security reasons, the A-key is never transmitted over the air interface between the base station and the mobile station, or over the network interface between different cellular systems. The A-key is stored in the MTSO or the HLR and must be entered into the memory of the mobile station for use in updating the SSD. The A-key can be entered into the mobile station at the time of mobile service activation by an authorized technician using the standard number assignment module (NAM) programming mode, or at any time by the mobile subscriber using a separate Akey programming mode as disclosed in U.S. Pat. No. 5,551,073, which is incorporated herein by reference. For any mobile stations which have multiple NAMs and use multiple MINs (i.e., where the user subscribes to service from multiple home systems in order to avoid roamer charges in those systems), multiple A-keys may have to be entered into the mobile station, one for each NAM (MIN). A different A-key should be entered for each MIN since, for security reasons, the A-key can be known only to the mobile station and the MTSO or HLR of the home system, and should not be passed from system to system as the mobile station roams. Thus, SSD updates (in which the A-key is used to generate new SSD values) are carried out only in the mobile station and its associated home system MTSO or HLR, which then sends the SSD values (but not the A-key) to the serving system.

Because of the importance of the A-key for authentication purposes, the issue of A-key security management has been of concern to the industry. It was originally envisioned that each mobile station would be shipped from the factory with a default A-key consisting of all binary zeros and that an operational value for the A-key would be assigned by the system operator when a mobile subscriber signed up for service. The assigned A-key value then would be entered by the service technician or the user. However, because of the administrative burden and the security risk associated with the delivery (e.g., through the post) of numerous A-keys to service technicians or mobile subscribers, it was deemed more preferable that the manufacturers of the mobile stations would ship each of the mobile stations with a random A-key value. Any manufacturer then could provide any system operator with a list of ESN/random A-key combinations in a secure database, for example. The A-key values from this list, in turn, would be programmed into the home system MTSO or HLR and used by the system operator for authenticating the corresponding mobile stations.

At present and for the foreseeable future both of the foregoing approaches to A-key management (default A-key and random A-key) have been and are expected to be used in the cellular industry. The default A-key approach is followed by some operators because of its simplicity and/or because of the inability of some MTSOs to be programmed with specific A-key values (random or otherwise) for all of the various subscribers. A few of these operators have even resorted to resetting the A-key to the default value in all cases, including those in which the A-key may have been initially set to a random value. Other operators, however, prefer to use the random A-key approach because of its added security. Still other operators who seek additional security recognize that an ESN/random A-key list can become excessive, unmanageable or corrupted, and that for multiple NAM mobile stations the same random A-key will be available to multiple carriers thus compromising security (unless the manufacturer is willing to program different random A-key values for the different NAMs in which case the ESN/A-Key list may become even larger). Such operators may prefer to have an individual (custom) A-key assigned to the mobile subscriber at the time of service activation for entry into his mobile station.

Given this background and the proclivity of some subscribers to switch between different service providers (operators) possibly having different A-key management policies, there is a need for an A-key management procedure which integrates the existing approaches, while at the same time avoiding their shortcomings such as the cost of maintaining lists of random A-keys for the mobile stations from each manufacturer.

SUMMARY OF THE INVENTION

The present invention allows the selection of an A-key from among the various possible default, random and custom values during NAM programming of a mobile station. If a default value is desired, the A-key can be set to this value in the field and not only at the time of manufacture of the mobile station. Similarly, if a random value is selected, this value may be generated internally in the mobile station using a set of input data and an algorithm which are also available to the home system. Alternatively, the random value may be precomputed by the manufacturer using such algorithm and then stored in the mobile station for possible selection as the A-key. Thus, the home system or manufacturer of the mobile station need not maintain a list of ESN/random A-key values since it can use a predefined algorithm to arrive at a duplicate of the random A-key value generated or previously stored in the mobile station. Furthermore, if the mobile station of the present invention should switch subscriptions from a home system which prefers to use a random A-key to a new home system which prefers to use the default A-key, the A-key stored in the mobile station can be readily reset from the random A-key value to the default value (or vice versa). If at any time a custom A-key is to be used, the present invention also provides the facility to enter such an A-key into the mobile station.

In one aspect, the present invention provides a method for configuring a mobile station with an authentication key (A-key) which is stored in a memory of the mobile station. The method comprises the steps of enabling the mobile station to receive a command entered by a user for selecting among a plurality of possible values for the A-key, including a default value and a random value; setting the A-key in the memory to the default value if the command indicates the selection of the default value; and setting the A-key in the memory to the random value if the command indicates the selection of the random value. The random value may be generated in the mobile station in response to the command indicating the selection of the random value or, alternatively, it may be a previously generated random value which is stored in the mobile station for use as the A-key if the command indicates the selection of the random value. In either case, the random A-key value can be generated from input data including the electronic serial number (ESN) of the mobile station and the system identification of the home system (SIDH) of the mobile station, thus ensuring a different random A-key value for each mobile station and for each NAM stored in the mobile station. Furthermore, according to this method, the possible A-key values may further include a custom value to be entered by the user and the method may further comprise the step of setting the A-key in the memory to the custom value entered by the user if the command indicates the selection of the custom value. The command, whether for selecting the default, random or custom A-key value, may be entered during number assignment module (NAM) programming of the mobile station.

In another aspect, the present invention provides a mobile station comprising a memory for storing a value for an authentication key (A-key); means for entering a command for selecting among a plurality of possible values for the A-key, including a default value and a random value; means for setting the A-key in the memory to the default value if the command indicates the selection of the default value; and means for setting the A-key in the memory to the random value if the command indicates the selection of the random value. According to this other aspect, the possible A-key values may further include a user-entered value and the mobile station may further comprise means for setting the A-key in the memory to the user-entered value if the command indicates the selection of the user-entered value. The mobile station may further comprise means for displaying a list of possible alphanumeric identifications for the user-entered A-key value from which list an alphanumeric identification can be selected for storing with the user-entered A-key value in the memory. The stored A-Key value then can be recalled from memory and displayed using its alphanumeric identification rather than displaying its actual value which should remain hidden from view for security purposes.

These and other aspects, objects and advantages of the present invention will become readily apparent from the accompanying drawings and the detailed description as set forth below.

BRIEF DESCRIPTION OF THE DRAWINGS

The present invention will be better understood and its numerous objects and advantages will become apparent to those skilled in the art by reference to the following detailed description taken in conjunction with the accompanying drawings in which.

DETAILED DESCRIPTION

Figure 1:
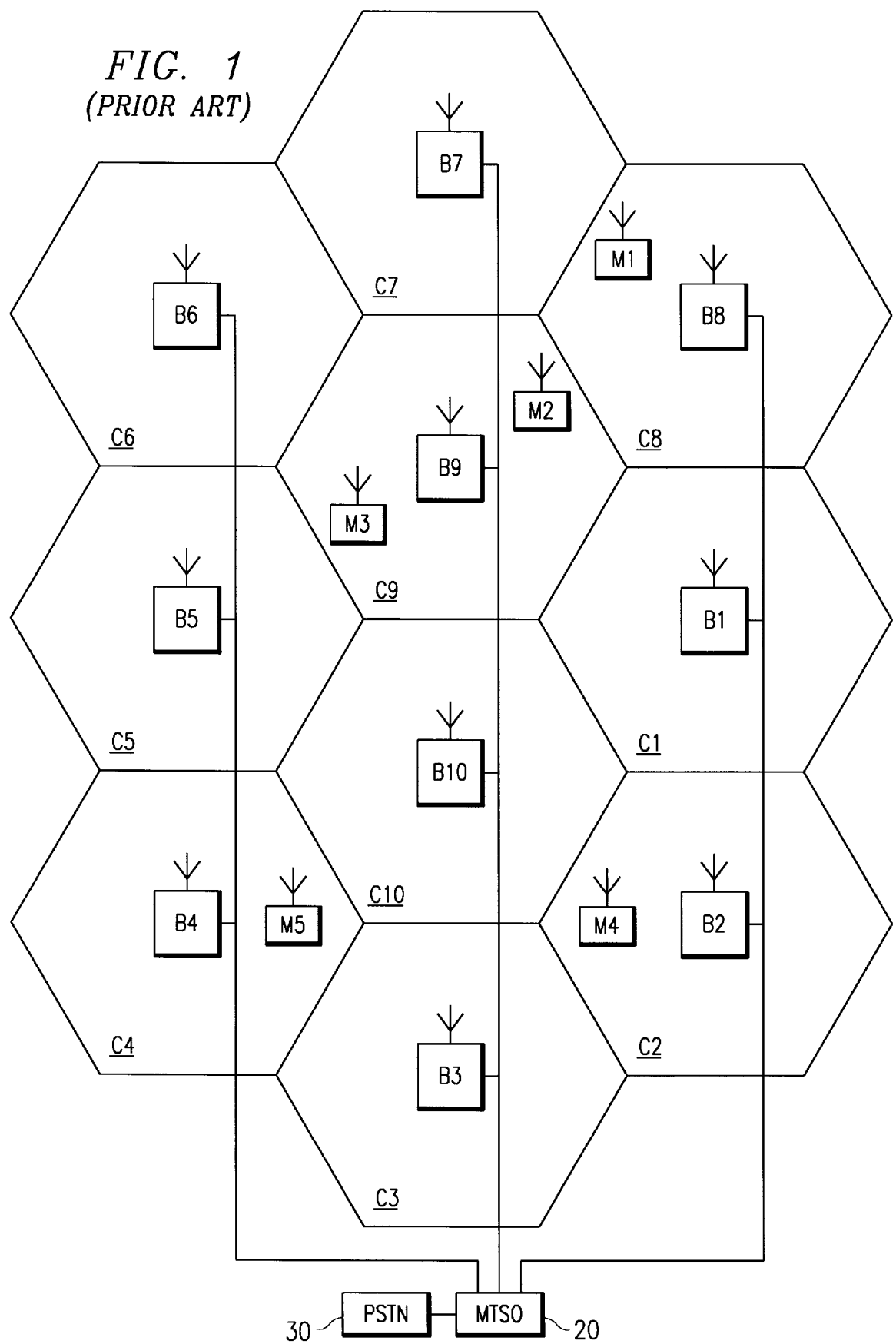
FIG. 1 shows the architecture of a conventional cellular radio system including a plurality of mobile stations and base stations.
Figure 2:
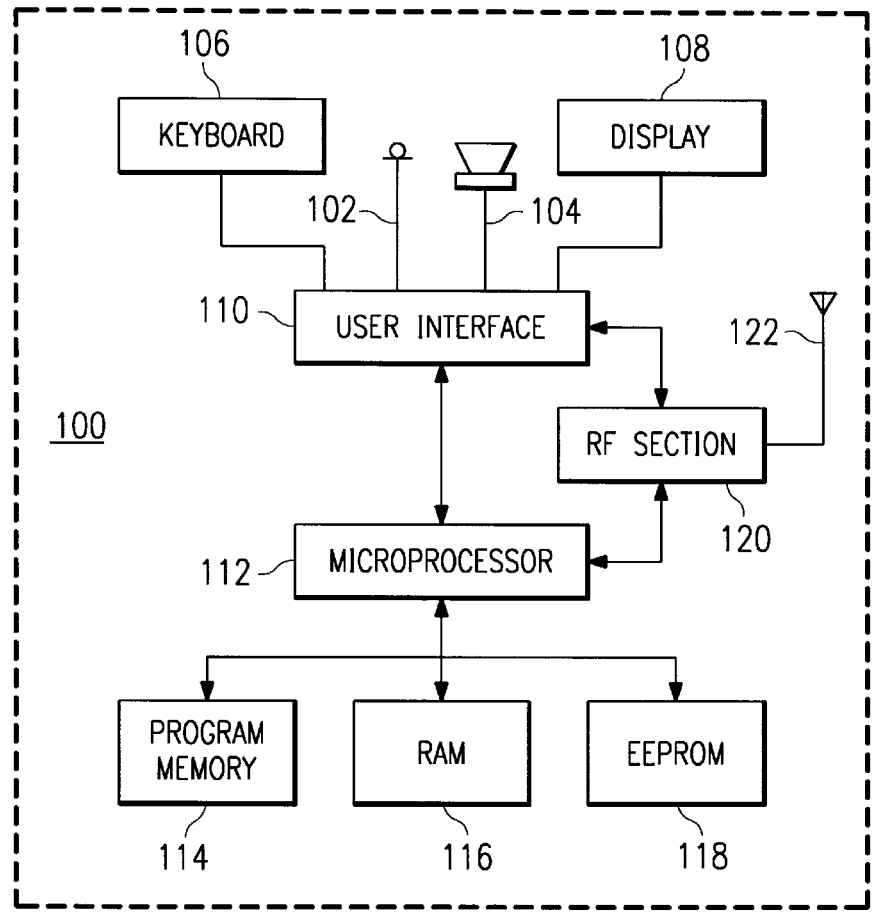
FIG. 2 is a simplified block diagram of a mobile station that can be used in accordance with the present invention.

Referring now to FIG. 2, there is shown a simplified block diagram of a mobile station 100 which may be used in accordance with the present invention. The mobile station 100 comprises a microphone 102, a loudspeaker 104, a keyboard or keypad 106, an alphanumeric or graphical display 108, a user interface 110, a microprocessor 112, a program memory 114, a random access memory (RAM) 116, an electrically erasable programmable read only memory (EEPROM) 118, a radio frequency (RF) section 120 and an antenna 122. The user interface 110 includes speech and data processing circuitry (not specifically shown) such as a codec for performing analog-to-digital (A/D) conversion of a transmit speech signal from the microphone 102 and digital-to-analog (D/A) conversion of a received speech signal destined for the loudspeaker 104. The user interface 110 further includes a digital signal processor (DSP) for performing gain/attenuation, filtering, compression/decompression, channel coding/decoding and any other desired processing (e.g., in accordance with IS-136) of speech and user or control data.

The RF section 120 includes RF processing circuitry (not specifically shown) such as an RF transmitter for modulating the transmit speech or data onto an analog carrier signal, up-converting the modulated signal to the selected channel frequency and then filtering, amplifying and transmitting the signal through the antenna 122. The RF section 120 further includes an RF receiver for down-converting a modulated signal received through the antenna 122 into an intermediate frequency (IF) signal and then filtering and demodulating the IF signal for further processing in the DSP. The microprocessor 112 controls the overall operation of the mobile station 100 through software programs stored in the program memory 114. These programs include, for example, executable instructions for each of the transmit and receive operations on the digital control channel (DCCH) and the digital traffic channel (DTCH) as specified in IS-136. The RAM 116 holds the values of temporary variables used in the execution of these instructions. Parameters whose values must be preserved after power is turned off in the mobile station 100 will be stored in the EEPROM 118 (or in a similar non-volatile or flash memory). Such parameters include the mobile identification number (MIN), the electronic serial number (ESN) of the mobile station 100, the station class mark (SCM), the system identification of the home system (SIDH), and the authentication key (A-key).

Figure 3:
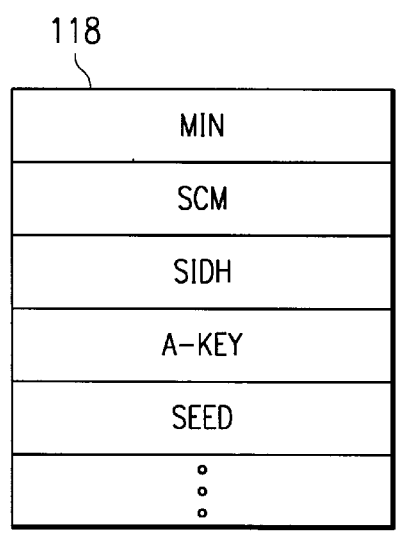
FIG. 3 is a block diagram of a NAM information block stored in the EEPROM of the mobile station of FIG. 2.

Referring next to FIG. 3, there is shown a block diagram of a number assignment module (NAM) information block which is stored in the EEPROM 118 in accordance with the present invention. During NAM programming a service technician authorized by a cellular carrier (operator) enters the values of certain subscriber-specific, mobile-specific and system specific parameters into the mobile station in order to setup and configure the mobile station for operation in the system of that carrier. As shown in FIG. 3, a typical NAM information block includes the MIN, SCM and SIDH (which are specific to the subscriber, mobile station and system, respectively) as well as other parameters which are not specifically shown in FIG. 3. In the case of subscribers who have signed up for service from multiple carriers, the EEPROM 118 will contain multiple NAM information blocks of the type shown in FIG. 3, one for each of these carriers. It will be appreciated that although each of the parameters in FIG. 3 is shown to be contained in a single memory location, in practice different portions of the value of any parameter may be stored in different memory locations due to memory size or other constraints.

With continuing reference to FIG. 3, each NAM information block in the mobile station 100 will include an A-key value which, for security reasons, may be encoded or encrypted and/or spread over several memory locations within the corresponding NAM block. According to the present invention, this A-key value can be a "default" (all zeros) value, a "random" (randomly generated) value or a "custom" (user-defined) value. Furthermore, as also shown in FIG. 3, the NAM information block may include a "SEED" value which may be used in generating the random A-key value in accordance with the present invention. The selection and storage of the desired A-key is described further below.

Figure 4:
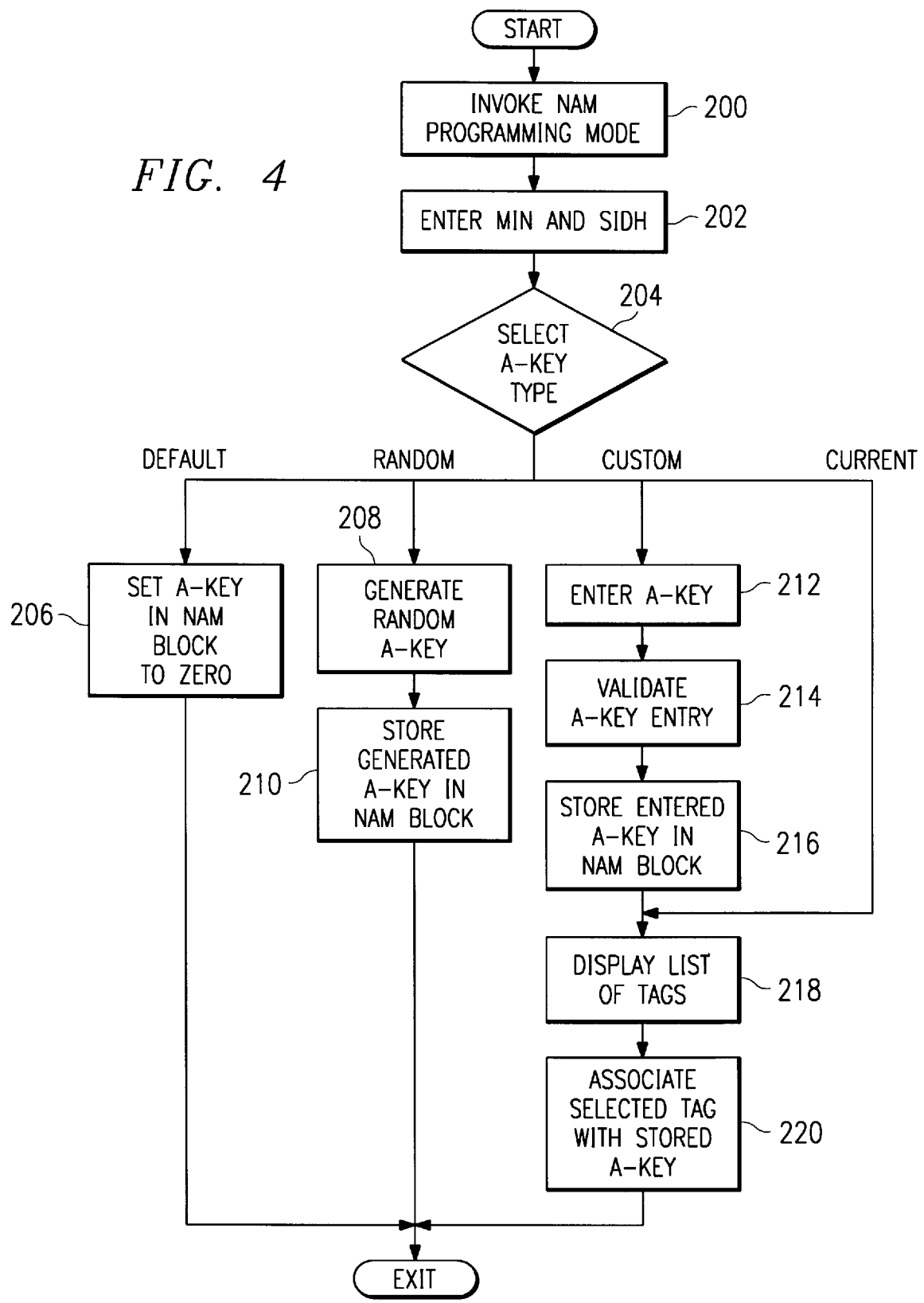
FIG. 4 is a flow chart of the A-key selection and storage steps executed by the mobile station of FIG. 2 in accordance with the present invention.

Referring next to FIG. 4, there is shown a flowchart of the A-key selection and storage procedure performed by a mobile station in accordance with the present invention. This procedure is initiated by the user invoking the NAM programming mode at step 200. While in NAM programming, the display 108 will prompt the user to enter the values for parameters in a particular NAM block (i.e., associated with a particular cellular operator). Thus, for example, the user at step 202 may enter through the keyboard 106 the MIN and SIDH assigned by or for a particular "home" system for storage in the corresponding NAM block (as shown in FIG. 3). After the values for these (and possibly other) parameters have been entered, the display 108 will prompt user at step 204 to select among a default A-key, a random A-key or a custom A-key, or alternatively to add an alphanumeric tag to the current A-key stored in the NAM block.

If, at step 204, the user had selected the default A-key option, the A-key in the NAM block will be set to the value zero at step 206. However, if the user had selected the random A-key option at step 204, a pseudo-random A-key will be generated at step 208 based on the SIDH entered during NAM programming, the ESN of the mobile station and possibly the SEED value. The SEED value can be any value available in both the mobile station and the system such as the RAND or REGID value transmitted over the control channel or, alternatively, a predetermined value stored or generated in both the mobile station and the system. The SIDH, ESN and/or SEED are used as inputs to the CAVE algorithm or another algorithm that is capable of generating a pseudo-random A-key value having a normal distribution. The pseudo-random A-key value generated by this algorithm is stored in the appropriate NAM block at step 210.

In an alternative embodiment of the present invention, a pseudo-random A-key value can be precomputed for any SIDH/ESN combination at the factory using an algorithm in the manner described above. For example, a particular cellular operator may order a number of mobile stations from the manufacturer, all of which are specified to have a random A-key value. The manufacturer then can use the SIDH of this operator and the ESN of each mobile station to generate a corresponding random A-key value which is stored in the memory of the mobile station. In this case, when the user at step 204 selects the random A-key option, the stored random A-key value will be written into the appropriate location in the NAM block as shown in FIG. 3. It will be readily appreciated that, for a multiple NAM mobile station, multiple random A-key values may be precomputed and stored in the memory of the mobile station, one A-key for each NAM. Thus, after the user has entered the relevant values into a particular NAM block at step 202 and then selected the random A-key option at step 204 as shown in FIG. 4, the stored random A-key value associated with that NAM will be written into the corresponding NAM block.

It will be recognized that the generation of a random A-key (or more accurately a "pseudo-random" A-key since it is generated with an algorithm) in accordance with the present invention avoids the necessity and cost of maintaining an ESN/random A-key list for all mobile stations produced by each manufacturer since either the manufacturer or the home system can calculate the random A-key value for any mobile station at any time using predetermined input data (e.g., SIDH, ESN and/or SEED) in a predetermined algorithm (e.g., CAVE). Furthermore, since the ESN of any mobile station is unique, each mobile station will have a unique, random A-key value thus increasing the security of the system. In addition, since the SIDH of any system is unique, the value of the random A-key (which also is based on the SIDH) will be different for each subscription (NAM block) maintained by the same mobile station (ESN). In other words, different "home" carriers for the same mobile station will use different random A-key values thus further increasing security by eliminating the need to share the same A-key value among these carriers.

Returning to step 204, the user may have selected the option of entering a specific (custom) A-key into the current NAM block. At step 212 the user enters the digits of the A-key through the keyboard 106. These digits are validated at step 214 through a verification procedure that is specified, for example, in Appendix A to each of IS-54 and IS-136. Once the entered A-key is validated, it will be stored in the current NAM block at step 216. Next at step 218 a list of alphanumeric tags will appear on the display 108 so that the user can select one of these tags to serve as an identification for the just-entered A-key. This step allows the user to later recall and display the A-key using its identification since the A-key itself is not to be displayed for security reasons. The tag will inform the user that the current A-key in the corresponding NAM block is neither a default nor a random A-key but is a custom A-key value that was previously stored in this NAM block. In general, the tag may be any predefined alphanumeric string such as the date on which the custom A-key value was last entered. Once the tag has been selected by the user, it will be associated with the stored A-key at step 220.

If at step 204, the user had selected the option of entering a tag for the current A-key stored in the NAM block, the value of that A-key, which may have been previously entered using the separate A-key entry procedure as described in U.S. Pat. No. 5,551,073 (incorporated herein by reference), will not be changed and the procedure simply jumps to steps 218–220 for selection and storage of an appropriate tag.

The foregoing detailed description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

I claim:

1. A method for configuring a mobile station with an authentication key (A-key) which is stored in a memory of said mobile station, the method comprising the steps of:

enabling said mobile station to receive a command entered by a user for selecting among a plurality of possible values for said A-key, including a default value and a random value;

setting said A-key in said memory to said default value if said command indicates the selection of said default value; and setting said A-key in said memory to said random value if said command indicates the selection of said random value.

2. The method of claim 1 wherein said command is entered during number assignment module (NAM) programming of said mobile station.

3. The method of claim 1 wherein said default value is zero.

4. The method of claim 1 wherein said random value is a function of predetermined data including the electronic serial number (ESN) of said mobile station.

5. The method of claim 4 wherein said data further includes the system identification of the home system (SIDH) of said mobile station.

6. The method of claim 4 wherein said data further includes a predetermined SEED value.

7. The method of claim 1 wherein said possible A-key values further include a custom value to be entered by said user and the method further comprises the step of setting said A-key in said memory to the custom value entered by said user if said command indicates the selection of said custom value.

8. The method of claim 7 wherein said custom value is validated after being entered by said user and prior to setting said A-key in said memory to said custom value.

9. The method of claim 7 further comprising the step of enabling said mobile station to receive an alphanumeric identification of said custom value entered by said user for storing with said custom value in said memory.

10. A mobile station comprising:

a memory for storing a value for an authentication key (A-key);

means for entering a command for selecting among a plurality of possible values for said A-key, including a default value and a random value;

means for setting said A-key in said memory to said default value if said command indicates the selection of said default value; and means for setting said A-key in said memory to said random value if said command indicates the selection of said random value.

11. The mobile station of claim 10 wherein said memory comprises an electrically erasable programmable read only memory (EEPROM).

12. The mobile station of claim 10 wherein said command entering means comprises an alphanumeric keyboard.

13. The mobile station of claim 10 wherein said command is entered during number assignment module (NAM) programming of said mobile station.

14. The mobile station of claim 10 wherein said default value is zero.

15. The mobile station of claim 10 wherein said random value is a function of predetermined data including the electronic serial number (ESN) of said mobile station.

16. The mobile station of claim 15 wherein said data further includes the system identification of the home system (SIDH) of said mobile station.

17. The mobile station of claim 15 wherein said data further includes a predetermined SEED value.

18. The mobile station of claim 10 wherein said possible A-key values further include a user-entered value and said mobile station further comprises means for setting said A-key in said memory to said user-entered value if said command indicates the selection of said user-entered value.

19. The method of claim 18 wherein said user-entered value is validated prior to setting said A-key in said memory to said user-entered value.

20. The mobile station of claim 18 further comprising means for displaying a list of possible alphanumeric identifications for said user-entered A-key value from which list an alphanumeric identification can be selected for storing with said user-entered A-key value in said memory.

* * * * *